April 5, 1932.  H. M. CROWTHER  1,851,976

CORRUGATED TUBULAR PACKING

Filed Dec. 12, 1928

Henry M. Crowther.
INVENTOR.

Patented Apr. 5, 1932

1,851,976

UNITED STATES PATENT OFFICE

HENRY M. CROWTHER, OF LOS ANGELES, CALIFORNIA

CORRUGATED TUBULAR PACKING

Application filed December 12, 1928. Serial No. 325,638.

This invention relates to deep well and other plunger pumps, and more particularly to the plunger packing.

An object is to provide a pump plunger having a tubular rod, surrounding which and mounted with, is slidingly positioned an annular layer of soft fibre applied with the fibre lengths laid longitudinally, and preferably not woven; and with spaced annular bindings of strap metal closely wound around the annular layer of said soft fibre, and riveted as a smaller circular band, countersunk into the yielding fibre layer, thus constricting the fibre layer into a series of annular, spaced corrugations in its outside surface.

Figure 1:
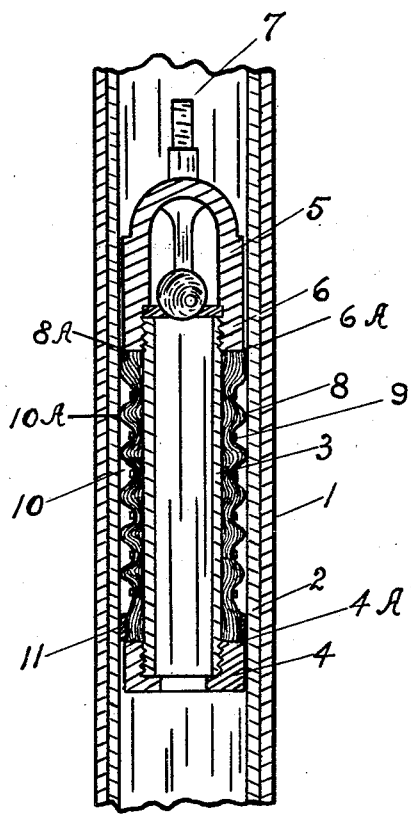
Figure 2:
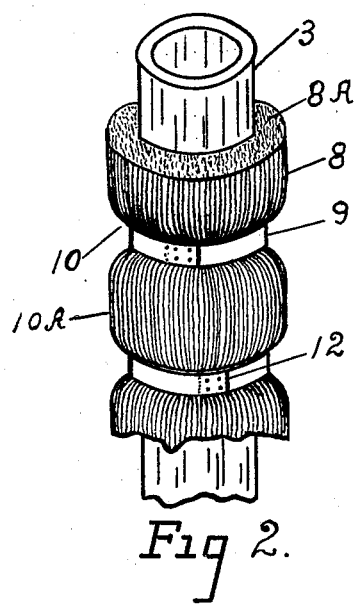

Thus is formed the packing member consisting of an annular, corrugated transversely, soft fibre cylinder, free to slide downwardly on its central mounting tube and expand at its unbound intervals, as the liquid pressure resisting the plungers upward stroke forces the packing slightly downward, in the action of pumping, to seal and keep sealed leak-tight, the space between the plunger, and the pump barrel cylinder. I accomplish these objects by the mechanism illustrated in the accompanying drawings, in which: Fig. 1 is an axial longitudinal section of the said soft fibre, corrugated packing, mounted on a pump plunger of conventional type. Fig. 2 is an enlarged view of a section of the said soft fibre, corrugated packing, and showing the manner of slidingly mounting on the hollow pump-rod, and means of using the spaced bindings to form the spaced corrugations.

Figure 3:
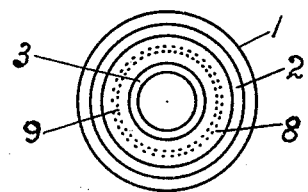

Fig. 3 is a horizontal plan outline to show circular construction. More specifically, 1 indicates the outer shell of the pump barrel, 2 is the tubular liner, and 3 is the hollow bored pump rod, the lower end of which is threaded to mount the gland 4, the top surface 4A of which seats the packing.

The ball check valve cage 5 is screwed to threaded upper end of the hollow pump-rod, and has a depending section 6, which at its lower face provides the upper packing end retainer 6A.

The top of the upper valve cage has the usual threaded stem to connect the rods. Between the said upper and lower packing seats is provided space to mount soft fibre layer 8 of the packing material which is wound around the hollow pump-rod annularly, and with the fibre longitudinally laid of thickness sufficient to fill the space between the plunger rod and the pump barrel wall; and annular, spaced bands 9 are tightly wound around the packing material at spaced intervals, and riveted at overlap as shown at 12, to form the alternate depressions 10 and the ridges 10A, to form a series of annular spaced corrugations in the outer surface of the packing member thus formed; and this corrugated, tubular packing member is free to slide downward with the liquid pressure of the up-stroke of pumping, with object to increase the bulge of the corrugation ridges to compress, and expand the packing member, to cause the packing to function in leak-proof manner, and continue to take up wear. The top end of the soft fibrous material as at 8A is not bound with a band, with object to allow this portion to freely expand; and the lower end of the fibrous, tubular packing is protected from spreading by the ring 11, with object to allow of the plunger and its packing to be lowered into the pump tubing and cylinder without fraying; and to further protect the soft packing in lowering, the packing is first saturated with hot paraffin, and cooled, to provide a protective surface, which the heat of the well and oil will dissolve later, as used in an oil well, but where used in a water well the coating may be done with glue, which the water will later dissolve.

Laying the said soft fibre, made say of long lengths of unwoven flax, longitudinally, the advantage is gained by providing an evenly compressible packing tube. Various changes may be made without departing from the scope and spirit of the invention.

I claim:

1. A pump packing formed of annular bindings, and a suitable length of unwoven, soft fibre laid longitudinally, and applied and secured in suitable thickness in a tubular layer surrounding and mounted with the plunger at spaced intervals by said annular bindings.

2. A pump packing formed of annular bindings, and a suitable length of soft yielding material, applied and secured in suitable thickness in tubular layer surrounding and mounted with the plunger at spaced intervals by said annular bindings to provide in a packing member a series of constricted band sections alternating with soft unbound bulges in the form of wave-like annular corrugations.

3. A pump packing formed of annular bindings, and a suitable length of soft fibrous material, applied and secured, slidingly, in suitable thickness of tubular layer surrounding and mounted with the plunger by said annular constriction bindings at spaced intervals, and said fibrous material loaded with hot paraffin and cooled, and the said tubular fibrous packing member having an unbound top section, and a guard ring on its lower end, to provide in a pump cylinder, and slightly slidingly positioned between upper and lower seats, a fitted series of packing bulges and depressions alternating, and transversely formed, to be compressed and expanded by the pressure of pumping to seal and keep sealed against leakage and wear, the plunger action in the pump barrel, all substantially as set forth herein.

HENRY M. CROWTHER.